Patented May 16, 1950

2,508,182

UNITED STATES PATENT OFFICE 2,508,182

PENTACHLORO - 2,4 - CYCLOPENTADIENYLIDENE-1-ACETIC ACID AND DERIVATIVES THEREOF

Earl T. McBee and Jack S. Newcomer, West Lafayette, Ind., assignors to Purdue Research Foundation, West Lafayette, Ind., a corporation of Indiana No Drawing. Continuation of application Serial No. 757,948, June 28, 1947. This application October 1, 1948, Serial No. 52,406

8 Claims. (Cl. 260—468)

The present invention relates to a method for the preparation of a novel compound, pentachloro-2,4-cyclopentadienylidene-1-acetic acid, to the compound itself, and to derivatives of the novel acid. This application is a continuation of our co-pending application Serial 757,948, filed June 28, 1947.

An object of the present invention is the provision of novel compounds, pentachloro-2,4-cyclopentadienylidene-1-acetic acid, pentachloro-2,4-cyclopentadienylidene-1-acetyl chloride, and esters and amides thereof. A further object is the provision of a method whereby the novel compounds may be produced. Other objects will become apparent hereinafter.

The products of the present invention are useful chemical intermediates for the production of more complex molecules, e. g., plasticizers and insecticides. The acid and acid chloride are also useful in the preparation of esters having notable physiological properties.

Pentachloro-2,4-cyclopentadienylidene-1-acetyl chloride is readily produced by the hydrolysis of octachloro-5-ethylidene-1,3-cyclopentadiene (prepared as in the present application Serial 757,948), with sulfuric acid, preferably concentrated sulfuric acid, i. e., sulfuric acid of a concentration above about 50 percent and usually above about 80 percent. The reaction rate with acid of less than about 70 percent concentration is generally too low to be of any practical value. The temperature range for the reaction may be anywhere between about 60 degrees and about 150 degrees centigrade, but is ordinarily maintained between about 90 and 120 degrees centigrade. The reaction is more conveniently and rapidly conducted when an excess of sulfuric acid is employed, and agitation of the reaction mixture is advantageous in promoting more efficient contact of the reactants. The time required for carrying out the reaction may vary considerably, depending upon the concentration of the acid and other operating conditions, such as the exact temperature employed.

Pentachloro - 2,4 - cyclopentadienylidene - 1 - acetyl chloride is readily converted to pentachloro-2,4-cyclopentadienylidene-1-acetic acid by the action of a hydroxide and subsequent acidification of the reaction mixture. The acid may be separated and purified in any conventional manner which will be apparent to one skilled in the art.

Derivatives of pentachloro-2,4-cyclopentadienylidene-1-acetyl chloride

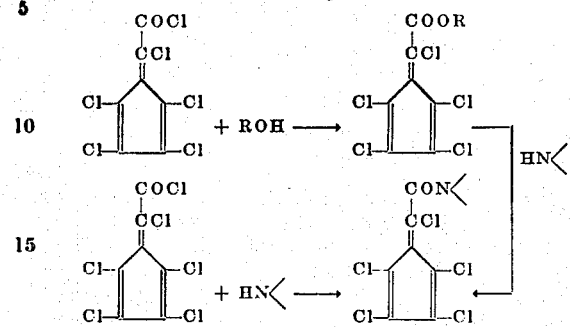

As illustrated by the first equation above, wherein R represents an alcohol residue, pentachloro-2,4-cyclopentadienylidene-1-acetyl chloride may be converted to an ester by reaction with an alcohol. Esters may also be prepared from the acetyl chloride by reaction with an alkali metal alcoholate, such as sodium methoxide or potassium ethoxide, however, an alcoholic solution of an alkali metal hydroxide is also suitable. Representative alcohols which may be reacted with pentachloro - 2,4 - cyclopentadienylidene-1-acetyl chloride to produce an ester thereof are methanol, ethanol, propanol, isopropanol, butanol, cyclohexanol, benzyl alcohol, and the like. Alkali metal hydrocarbonoxides such as sodium or potassium methoxide, ethoxide, propoxide, phenoxide, benzoxide, cyclohexoxide, naphthoxide, et cetera, are also operative for production of an ester of pentachloro-2,4-cyclopentadienylidene-1-acetic acid. Still other compounds which may be reacted with the acid chloride to produce an ester are ethylene glycol, glycerine, mannitol, sorbitol, pentaethythritol, erythritol, cellulose, sodium cellulose, allyl alcohol, sodium naphthoxide, and the like.

The reaction between the acid chloride and an alcohol may be conducted in either a slightly acid medium, a neutral medium, or a basic medium. The reaction of an alkoxide with the acid chloride is usually carried out in an alcoholic solution of the alkoxide. It is generally desirable to conduct the reaction under alkaline conditions.

The temperature for the esterification is usually between about 30 and about 150 degrees centigrade. Ordinarily, the reflux temperature of the reaction mixture used is preferred in instances where an alcohol and the acid chloride are reacted together without basic catalysis; but, with an alcohol in the presence of a base, or with an alkoxide, lower temperatures are usually entirely satisfactory. Any conventional procedure for esterification may be employed and, in cases where an alcohol in an alkaline medium is not productive of an entirely satisfactory yield or reaction rate, it may be desirable to employ an alkali metal alkoxide. The potassium alkoxide is more reactive than the sodium alkoxide, and hence may be advantageously employed when the esterification is not readily accomplishd by other reagents. It may also be of advantage in some instances to employ an anhydrous medium for the reaction, or to employ an inert medium such as dioxane or trioxane. However, in general, the esterification may be conducted according to known procedure for such a reaction, and extraordinary conditions are usually unnecessary. The esterification occurs most readily in an alkaline medium, and, as the reaction is usually rapid or instantaneous, it is preferred to add the alcohol, in an alkaline medium, slowly to the acid chloride.

The compounds produced by the esterification have the general formula:

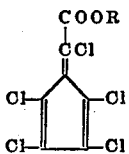

wherein R is a radical of an organic compound having the formula R—OH, and wherein R is an alcohol residue. Representative compounds have already been mentioned, and the esters wherein R is a lower-alkyl radical represent the preferred embodiment of the invention. In such compounds, R may be methyl, ethyl, propyl, isopropyl, and similar radicals. Numerous other esters may be prepared in the manner given above by the esterification of pentachloro-2,4-cyclopentadienylidene-1-acetyl chloride, or the free acid, with any of the aforementioned alcohols.

The second equation given previously illustrates the preparation of amides from esters of pentachloro-2,4-cyclopentadienylidene-1-acetic acid or from the acid chloride of the said acid by reaction with a compound containing at least the reactive group HN<. The compound containing this group may be ammonia, a primary amine, or a secondary amine. Representative compounds containing the group which may be reacted with esters or the acid chloride of pentachloro-2,4-cyclopentadienylidene-1-acetic acid are ammonia, methylamine, ethylamine, propylamine, isopropylamine, aniline, cyclohexylamine, ethanolamine, piperidine, aminopyridine, naphthylamine, dimethylamine, diethylamine, dibutylamine, diisobutylamine, phenylethylamine, cyclohexylethylamine, ethylpropylamine, diethanolamine, and the like. These compounds may be admixed with an alkyl ester at room temperature or slightly above in a solvent such as pentane, hexane, or other low-boiling hydrocarbons. The reactants are soluble in pentane while the product is insoluble in the solvent, and the product therefore usually precipitates out immediately upon formation. The reaction is generally instantaneous, and amides of high purity, usually white crystalline solids, are obtained therefrom.

The following examples are given to illustrate the practice of the present invention, but are in no way to be construed as limiting.

*Example 1.—Pentachlorocyclopentadienylidene-1-acetyl chloride*

A mixture of octachloroethylidene-1,3-cyclopentadiene (100 grams, 0.27 mole) and concentrated sulfuric acid (93 percent concentration, 800 grams) was vigorously agitated for two hours at 90 to 95 degrees centigrade, and then for two hours at 100 to 105 degrees centigrade. The solid obtained by pouring the cooled reaction mixture onto ice was recrystallized from methanol to give pentachlorocyclopentadienylidene-1-acetyl chloride (65 grams), having a melting point of 86 degrees centigrade. The purified product has physical properties as follows:

Melting point: 85–86 degrees centigrade.
Boiling point: 265–266 degrees centigrade at 740 millimeters of mercury pressure absolute.
Anal: calcd. percent Cl, 68.1; found percent Cl, 68.0.

This product was dissolved in 10 percent aqueous potassium hydroxide at a temperature below about 30 degrees centigrade. Acidification of the resulting solution with hydrochloric acid precipitated an acid slightly soluble in water, having an impure melting point of 105–107 degrees centigrade. This acid is of the probable structure:

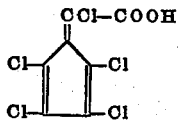

(Pentachlorocyclopentadienylidene-1-acetic acid)

*Example 2.—Pentachloro-2,4-cyclopentadienylidene-1-acetates*

A solution of 10 grams of potassium hydroxide in 100 milliliters of methyl alcohol was added to a mixture of 62 grams of pentachloro-2,4-cyclopentadienylidene-1-acetyl chloride ($C_7Cl_6O$) and 200 milliliters of methyl alcohol at a temperature of 45–47 degrees centigrade over a period of twenty minutes. The reaction mixture was allowed to cool to 42 degrees centigrade, and was thereafter diluted with water. A white solid precipitated during the dilution, was removed by filtration, and the filtrate acidified with hydrochloric acid to yield additional amounts of the solid. A total of 36 grams of the white solid, methyl pentachloro-2,4-cyclopentadienylidene-1-acetate, was obtained by recrystallization of the white solid from a mixture of hexane and carbon tetrachloride. Methyl pentachloro-2,4-cyclopentadienylidene-1-acetate was found to melt at 116 degrees centigrade and to contain 57.0 percent chlorine, as compared with the theoretical value of 56.7 percent chlorine. The yield of methyl pentachloro-2,4-cyclopentadienylidene-1-acetate was 70 percent.

Methyl pentachloro-2,4-cyclopentadienylidene-1-acetate was also prepared by refluxing a mixture of 30 grams of pentachloro-2,4-cyclopentadienylidene-1-acetyl chloride and 400 milliliters of methyl alcohol for three hours. Upon cooling and dilution of the reaction mixture with water, the ester precipitated. Recrystallization from a pentane-carbon tetrachloride mixture yielded 7 grams of a solid identical with the methyl pentachloro-2,4-cyclopentadienylidene-1-acetate obtained from pentachloro-2,4-cyclopentadienylidene-1-acetyl chloride and a solution of potassium hydroxide in methyl alcohol.

In a similar manner, ethyl pentachloro-2,4-cyclopentadienylidene-1-acetate, a white crystalline solid, is prepared from pentachloro-2,4-cyclopentadienylidene-1-acetyl chloride and sodium ethoxide or ethyl alcohol in an alkaline alcoholic medium.

*Example 3.—N,N-diethyl-(pentachloro-2,4-cyclopentadienylidene)-acetamide*

The slow addition of 6.3 grams of diethylamine to a solution of 16 grams of pentachloro-2,4-cyclopentadienylidene-1-acetyl chloride ($C_7Cl_6O$) in 100 milliliters of n-pentane at room temperature formed a yellow precipitate, N,N-diethyl-(pentachloro - 2,4 - cyclopentadienylidene) - acetamide. The amide was filtered, washed thoroughly with water, and recrystallized from a mixture of n-pentane and carbon tetrachloride. The yield of N,N-diethyl - (pentachloro-2,4-cyclopentadienylidene)-acetamide, melting at 107 degrees centigrade, was 10 grams. The chlorine content by analysis was 50.9 percent, as compared to the theoretical value of 50.7 percent. The yield was 56.1 percent.

The N,N-diethyl-(pentachloro - 2,4 - cyclopentadienylidene)-acetamide was also prepared by the addition of an excess of diethylamine to a pentane solution of methyl pentachloro-2,4-cyclopentadienylidene-1-acetate at room temperature.

*Example 4.—N-phenyl-(pentachloro - 2,4 - cyclopentadienylidene)-acetamide*

The slow addition of 9.3 grams of aniline to a solution of 17 grams of pentachloro-2,4-cyclopentadienylidene)-1-acetyl chloride ($C_7Cl_6O$) in 100 milliliters of n-pentane at room temperature resulted in the formation of a yellow precipitate, N - phenyl - (pentachloro - 2,4 - cyclopentadienylidene)-acetamide. The amide was filtered, washed thoroughly with water, and recrystallized from a mixture of pentane and carbon tetrachloride. The pure amide is a white solid melting at 220 degrees centigrade. The chloride content by analysis was 47.9 per cent, as compared to a theoretical value of 47.9 percent.

Various modifications may be made in the method of the present invention without departing from the spirit or scope thereof, and it is to be understood that we limit ourselves only as defined in the appended claims.

We claim:

1. A compound selected from the group consisting of pentachloro-2,4-cyclopentadienylidene-1-acetic acid, pentachloro-2,4-cyclopentadienylidene-1-acetyl chloride, pentachloro-2,4-cyclopentadienylidene-1-acetates, and pentachloro-2,4-cyclopentadienylidene-1-acetamides.

2. Pentachloro - 2,4 - cyclopentadienylidene-1-acetyl chloride.

3. Pentachloro - 2,4 - cyclopentadienylidene-1-acetic acid.

4. A lower-alkyl ester of pentachloro-2,4-cyclopentadienylidene-1-acetic acid.

5. Methyl pentachloro - 2,4 - cyclopentadienylidene-1-acetate.

6. The process which includes: hydrolyzing, with sulfuric acid of a concentration above about 50 percent at a temperature between about 60 and 150 degrees centigrade, octachloro-5-ethylidene-1,3-cyclopentadiene to pentachloro-2,4-cyclopentadienylidene-1-acetyl chloride.

7. The process which includes: hydrolyzing octachloro-5-ethylidene - 1,3 - cyclopentadiene to pentachloro-2,4-cyclopentadienylidene - 1 - acetyl chloride with concentrated sulfuric acid, having a concentration above about 80 percent, at a temperature between about 60 degrees and 150 degrees centigrade.

8. The method of claim 7, wherein the reaction temperature is between about 90 degrees and about 120 degrees centigrade.

EARL T. McBEE.
JACK S. NEWCOMER.

REFERENCES CITED

The following references are of record in the file of this patent:

UNITED STATES PATENTS

| Number | Name | Date |
|---|---|---|
| 1,965,792 | Chaux | July 10, 1934 |
| 2,337,846 | Coleman et al. | Dec. 28, 1943 |
| 2,390,941 | Jones | Dec. 11, 1945 |
| 2,441,128 | Barrick et al. | May 11, 1948 |